(12) United States Patent
deVries (10) Patent No.: US 6,289,309 B1
(45) Date of Patent: Sep. 11, 2001

(54) NOISE SPECTRUM TRACKING FOR SPEECH ENHANCEMENT

(75) Inventor: Albert deVries, Eindhoven (NL)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/464,663

(22) Filed: Dec. 15, 1999

Related U.S. Application Data
(60) Provisional application No. 60/112,742, filed on Dec. 16, 1998, and provisional application No. 60/112,652, filed on Dec. 17, 1998.

(51) Int. Cl.$^7$ .............................. G10L 5/06; G10L 15/02; H04B 15/00
(52) U.S. Cl. ..................... 704/233; 704/226; 704/268; 704/227; 704/217; 381/94; 381/94.3
(58) Field of Search .................................... 704/226, 268, 704/227, 217, 233; 381/94.3, 94

(56) References Cited

U.S. PATENT DOCUMENTS

| | | | |
|---|---|---|---|
| 5,757,937 | 5/1998 | Itoh et al. | 381/94.3 |
| 5,781,883 | 7/1998 | Wynn | 704/226 |
| 5,799,276 | 8/1998 | Komissarchik et al. | 704/251 |
| 5,839,101 | * 11/1998 | Vahatalo et al. | 704/236 |
| 5,842,162 | 11/1998 | Fineberg | 704/233 |
| 5,893,059 | 4/1999 | Raman | 704/256 |
| 5,943,429 | 8/1999 | Handel | 381/94.2 |
| 5,974,373 | 10/1999 | Chan et al. | 704/200 |
| 5,991,718 | 11/1999 | Malah | 704/233 |

FOREIGN PATENT DOCUMENTS

| | | | |
|---|---|---|---|
| WO 97/22116 | 6/1997 | (WO) | G10L/3/00 |
| WO 97/28527 | 8/1997 | (WO) | G10L/3/02 |

OTHER PUBLICATIONS

Gulzow, T., Engelsberg, A., and Heute, U., "Comparison of a Discrete Wavelet Transformation and a Nonuniform Polyphase Filterbank Applied to Spectral–Subtraction Speech Enhancement", Signal Processing, vol. 64, No. 1, pp. 5–19, 1998.

Ying, G. S., Mitchell, C. D., and Jamieson, L. H., "Endpoint Detection of Isolated Utterances Based on a Modified Teager Energy Measurement", Proc. of IEEE Int. Conf. on Acoustics, Speech, and Signal Processing, pp. 732–735, 1993.

(List continued on next page.)

*Primary Examiner*—Fan Tsang
(74) *Attorney, Agent, or Firm*—William J. Burke

(57) ABSTRACT

A spectrum-based speech enhancement system estimates and tracks the noise spectrum of a mixed speech and noise signal. The system frames and windows a digitized signal and applies the frames to a fast Fourier transform processor to generate discrete Fourier transformed (DFT) signals representing the speech plus noise signal. The system calculates the power spectrum of each frame. The speech enhancement system employs a leaky integrator that is responsive to identified noise-only components of the signal. The leaky integrator has an adaptive time-constant which compensates for non-stationary environmental noise. In addition, the speech enhancement system identified noise-only intervals by using a technique that monitors the Teager energy of the signal. The transition between noise-only signals and speech plus noise signals is softened by being made non-binary. Once the noise spectrum has been estimated, it is used to generate gain factors that multiply the DFT signals to produce noise-reduced DFT signals. The gain factors are generated based on an audible noise threshold. The method generates audible a priori and a posteriori signal to noise ratio signals and then calculates audible gain signals from these values.

11 Claims, 3 Drawing Sheets

OTHER PUBLICATIONS

Doblinger, G., "Computationally Efficient Speech Enhancement by Spectral Minima Tracking in Subbands", Proc. Europseech95, Madrid, Spain, 1995, pp. 1513–1516.

Ephraim, Y. and Malah, D., "Speech Enhancement Using a Minimum Mean–Square Error Short–Time Spectral Amplitude Estimator", IEEE Trans. Acoustics, Speech, and Signal Processing, vol. ASSP–32, No. 6, pp. 1109–1121, 1984.

McAulay, R. J. and Malpass, M. L., "Speech Enhancement Using a Soft–Decision Noise Suppression Filter", IEEE Trans. Acoustics, Speech, and Signal Processing, vol. ASSP–28, No. 2, pp. 137–145, 1980.

Johnston, James D., "Estimation of Perceptual Entropy Using Noise Masking Criteria", Proc. ICASSP '88, pp. 2524–2527, 1988.

PCT International Search Report, Application No. PCT/US99/29901, Jun. 6, 2000.

* cited by examiner

NOISE SPECTRUM TRACKING FOR SPEECH ENHANCEMENT

This patent claims the benefit of U.S. Provisional Application No. 60/112,742, filed Dec. 16, 1998 and U.S. Provisional Application No. 60/112,652, filed Dec. 17, 1998, the contents of which are incorporated herein by reference.

BACKGROUND OF THE INVENTION

The present invention relates generally to noise suppression apparatus and methods and in particular to a noise suppression system and method which detects and removes background noise from a voice signal using spectral subtraction.

Voice control of devices and appliances is becoming more and more prevalent. One example of this technology is in "hands free" control of mobile telephones. This application is especially important as it allows a driver to make calls or answer a telephone while keeping both hands on the steering wheel and both eyes on the traffic. Although the invention is described below in terms of a noise reduction method and system for a hands-free mobile telephone, it is contemplated that it may be practiced with any system which would benefit from noise reduction in a voice signal.

Voice control of mobile telephones, however, is complicated by the ambient noise in the automobile. Engine noise, windshield wiper noise, construction noise and the noise of passing cars and trucks can interfere with the voice recognition process making the mobile telephone difficult to control using just vocal signals. Existing voice control systems typically employ some form of speech enhancement to reduce the level of noise in the signal and then apply the noise-reduced signal to a voice recognition system. As the number of words that are recognized by a typical voice control system is relatively low, a speaker-independent voice recognition system may be used. Such a speaker-independent system is disclosed, for example, in U.S. Pat. No. 5,799,276 entitled KNOWLEDGE-BASED SPEECH RECOGNITION SYSTEM AND METHODS HAVING FRAME LENGTH COMPUTED BASED ON ESTIMATED PITCH PERIOD OF VOCALIC INTERVALS. Alternatively, it is contemplated that other speech recognition systems such as a conventional dynamic time warping system may be used.

In addition to reducing noise in user commands that control the mobile telephone, the speech enhancement system may also be used to reduce noise in the voice signal that is delivered through the telephone and, thus, enhance the speech signal that is received by the person being called.

Low complexity spectrum-based speech enhancement systems are generally based on the spectral subtraction principle: the noise power spectrum which has been estimated (and averaged) during noise-only periods is subtracted from the "speech-plus-noise" spectrum in order to estimate the power spectrum of the clean speech signal. The enhanced speech waveform makes use of the unaltered noisy phase. Formally, the enhanced speech spectrum can be expressed as $\hat{S}_k(f) = G_k(f)X$, where $X_k(f)$ is the (discrete) Fourier transform (DFT) of the noisy speech signal x(n) at frame index k, $\hat{S}_k(f)$ is estimated clean speech power spectrum, and G the gain factor. In the case of (power) spectral subtraction, the gain factor, G, is a vector given by $$G = 1 - \frac{\hat{P}_n}{P_x},$$

where $\hat{P}_n$ and $P_x$ are the estimated noise power spectrum and speech-plus-noise power spectrum respectively.

Before a speech enhancement system reduces the noise in a noisy voice signal, therefore, it first identifies the noise and estimates its power spectrum. Next, the noisy voice signal is processed according to the determined gain factor to selectively reduce the amplitude of the speech-plus-noise signal for the frequency bands in which noise dominates.

Even though these systems are "low complexity" they typically require a relatively large number of calculations and may not be appropriate for implementation in a mobile telephone environment. One method for reducing the complexity of the speech enhancement process is to assume that the noise component of the signal is stationary, that is to say, it does not change significantly over short time intervals. This assumption, however, is not appropriate for a hands-free mobile telephone controller as engine noise and traffic noise are poorly modeled by a stationary noise source.

SUMMARY OF THE INVENTION

The present invention is embodied in a low complexity speech enhancement method and system that employs a noise tracking method and system that effectively tracks non-stationary noise. The noise tracking system employs a time-varying forgetting factor that reduces the contribution, over time, of data frames that exhibit rapid changes in signal power.

According to one aspect of the invention, the noise tracking system tracks Teager energy to more effectively distinguish noise from unvoiced consonant sounds.

According to another aspect of the invention, the noise tracking system identifies noisy intervals in the system using a recognizer that classifies signals as containing only noise or containing a mixture of voice and noise. In the exemplary system, the transition between a noise-only signal and a voice and noise signal is made gradual to reduce the sensitivity of the noise tracking system to system parameters.

According to yet another aspect of the invention, the speech enhancement system employs a simplified gain factor calculation system based on a posteriori audible signal to noise ratios.

DETAILED DESCRIPTION

While the invention is described below in terms of a speech enhancement apparatus or method, it is contemplated that the method may also be practiced on a general purpose computer. In this embodiment, the invention resides in a computer program on a computer-usable carrier such as a diskette, compact disk read only memory (CDROM) or on an audio or radio frequency carrier signal.

Figure 1:
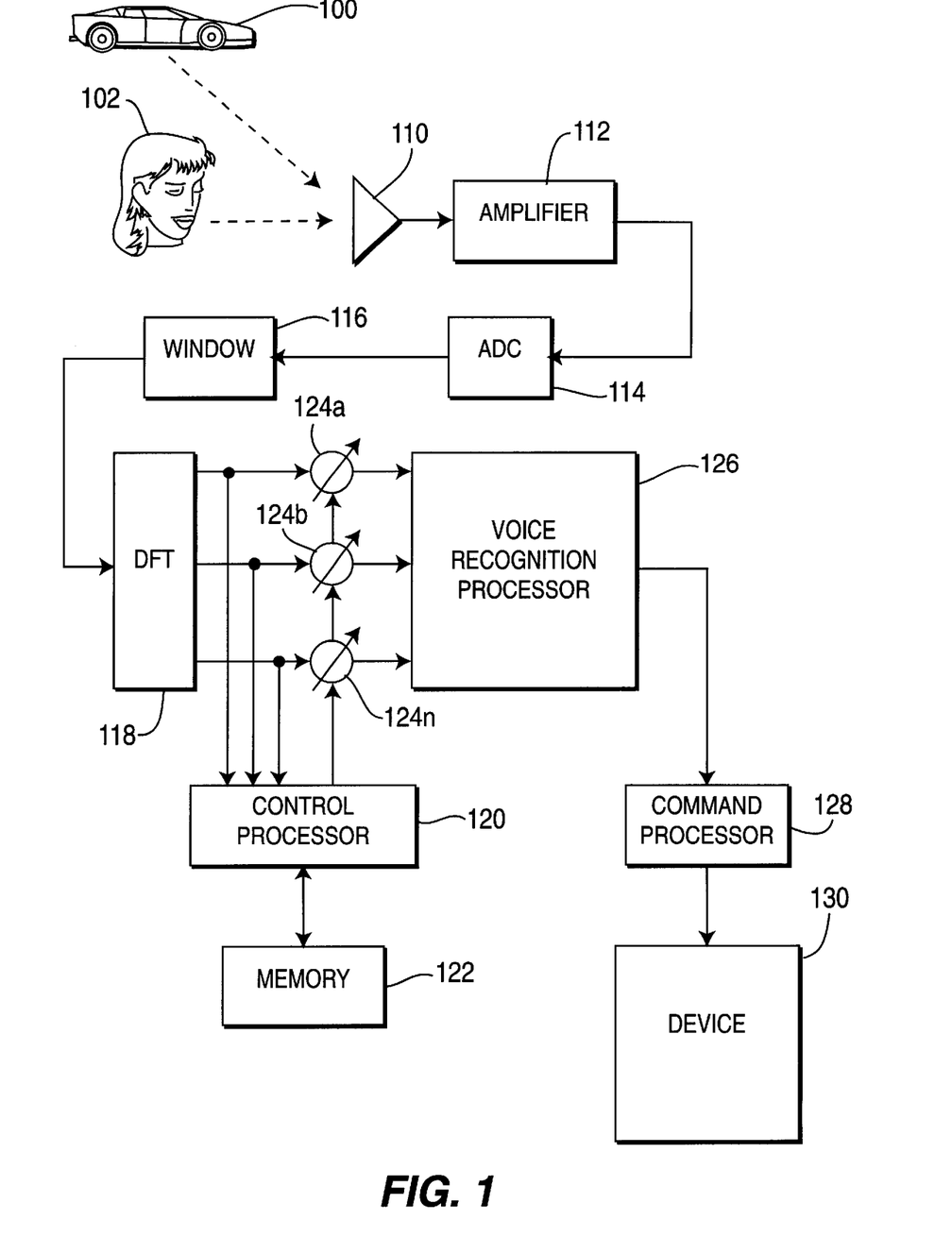
FIG. 1 is a block diagram of an exemplary speech enhancement system according to the present invention for use with a voice command system.

FIG. 1 is a block diagram of an exemplary voice command system that includes an embodiment of the present invention. In the exemplary system shown in FIG. 1, voice from a person 102 and noise from a noise source 100 are received at a microphone 110. These signals are amplified to usable levels by an amplifier 112. Next, the amplified signal is digitized in an analog to digital converter (ADC) 114 to provide a stream of digitized data representing both voice and noise.

The digital data provided by the ADC 114 is segmented into frames, each containing a predetermined number of samples. The frames are then applied to a windowing function 116. The speech signals are divided into frames and processed by the windowing function 116. The windowed segments of samples are then applied to a discrete Fourier transform (DFT) processor 118 to be converted into spectral coefficient values. In the exemplary embodiment of the invention, the DFT processor 118 implements the well-known fast fourier transform (FFT). The digital audio samples are segmented and processed by the windowing function 116 to improve the quality of the spectral estimate that is produced by the DFT processor 118; each frame, because it represents only a short time segment (e.g. 10 msec), may be regarded as being stationary.

The windowing function 116 may be any one of a number of different functions including the Hamming and Kaiser functions. When spectral subtraction is used as the noise reduction technique, it is common to use a 50% overlaping Hamming window and the "overlap and add" method of combining the windows when an inverse DFT (IDFT) is calculated. If, as shown in FIG. 1, the noise-reduced DFT values are used with a voice recognition system, it may be desirable to design the framing and windowing of the samples, performed by the windowing processor 116, to the framing and windowing used by the voice recognition processor 126.

As shown in FIG. 1, the DFT processor 118 produces multiple output signals, each corresponding to a respective spectral component of the windowed audio frame. Each spectral component is a complex value having an amplitude and a phase. The DFT values are provided to a control processor 120 and to respective gain adjusting circuits 124a, 124b and 124n. Although the DFT processor 118 is shown as providing three output signals, in an actual system many more frequency components may be provided.

The control processor 120, as described below, may track the noise components of the transformed voice and noise signal and, using estimates of the noise power spectrum, determine gain functions. These gain functions are then applied to the DFT values via the gain adjusting circuits 124a, 124b and 124n in order to produce noise-reduced DFT values. These values are applied to the voice recognition processor 126. The control processor uses a local memory 122 to store data values from current and prior audio frames as described below.

Processor 126 analyzes the noise reduced DFT values to recognize predetermined command words. In a mobile telephone environment, these may include the numbers 0 through 9 and command words such as "answer," "hang up," "dial," "directory," and "next." The command words recognized by the processor 126 are converted into respective control signals that are applied to the control processor 128 to control the operation of the device (e.g. mobile telephone) 130.

Figure 2:
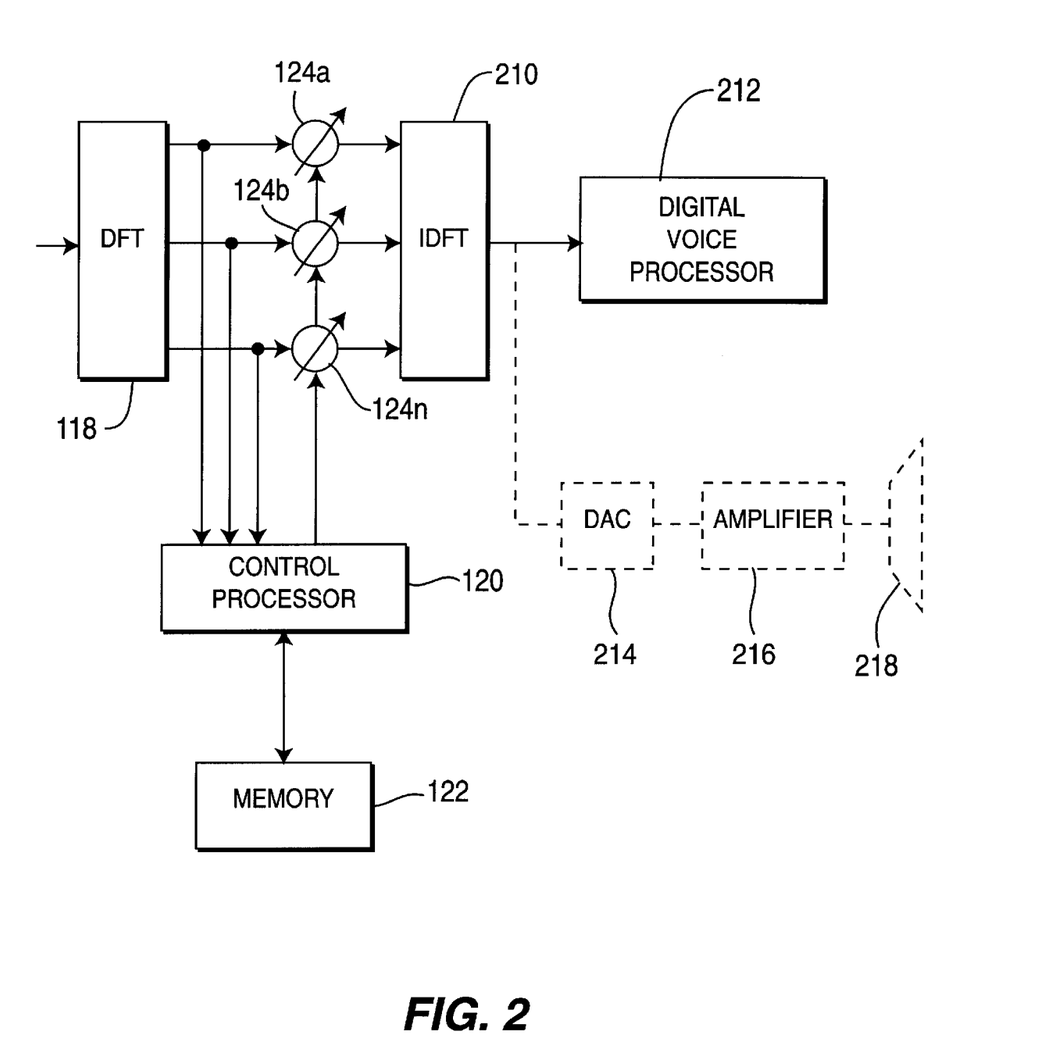
FIG. 2 is a block diagram which shows modifications to the speech enhancement system shown in FIG. 1 to provide an enhanced temporal speech signal.

In an alternative embodiment of the invention, or as an adjunct to the embodiment of the invention shown in FIG. 1, the noise-reduced DFT values may be converted back into the time domain to produce a noise-reduced voice signal. FIG. 2 shows an exemplary configuration, including a portion of the circuitry shown in FIG. 1.

As shown in FIG. 2, the noise-reduced DFT values, provided by the gain adjusting circuits 124a, 124b and 124n, are applied to an IDFT processor 210 (e.g. an inverse FFT processor) to produce a digital voice signal. This signal may be applied to a digital voice processor 212, for example, the digital voice input port of a mobile telephone, as a noise-reduced voice signal. Alternatively, as shown in phantom in FIG. 2, the digital voice signal may be applied to a digital to analog converter (DAC) to produce an analog signal which is then applied to an amplifier 216 and a speaker 218. This alternative embodiment may be used, for example, to clean-up signals received by the telephone that are generated by telephones that do not include a speech enhancement system.

The subject invention includes two major components, 1) a noise tracking or noise estimating system and 2) a noise reduction system. It is contemplated, however, that the noise tracking system may be used separately from the noise reduction system. There are applications in which the goal not to reduce the noise components in the speech signals but to distinguish between intervals that contain only noise and intervals that contain a mixture of voice and noise. In one such application, illustrated in FIG. 3, the audio signal is sampled (and, e.g. compressed) only when it includes voice components. Intervals having only noise components are ignored.

Figure 3:
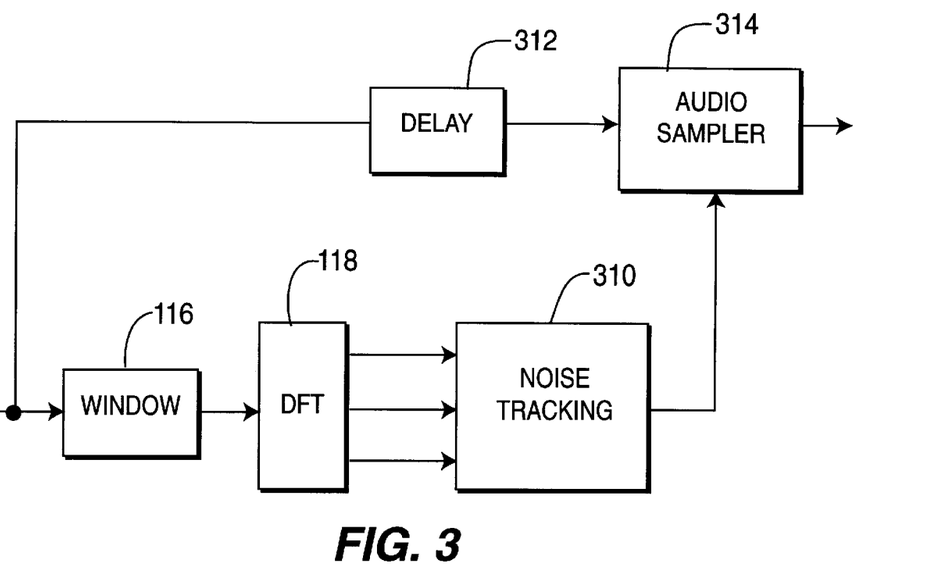
FIG. 3 is a block diagram of a noise tracking system according to the present invention.

In the exemplary system shown in FIG. 3, the digitized audio signals are provided to windowing circuit 116 and to a compensating delay element 312. The windowed audio frames are processed by the DFT processor 118 into DFT values. The DFT values are then processed by a noise tracking processor 310 which, as described below, separately identifies frames that include only noise and frames that include both noise and voice. The noise tracking processor 310 provides a smoothed signal that identifies all of the intervals which include both noise and voice. The signal is smoothed to include noise intervals that are adjacent to the noise and voice intervals. This smoothed signal is applied to an audio sampler 314 which captures and stores digital audio samples corresponding to voice mixed with noise to the relative exclusion of noise-only audio samples.

Figure 4:
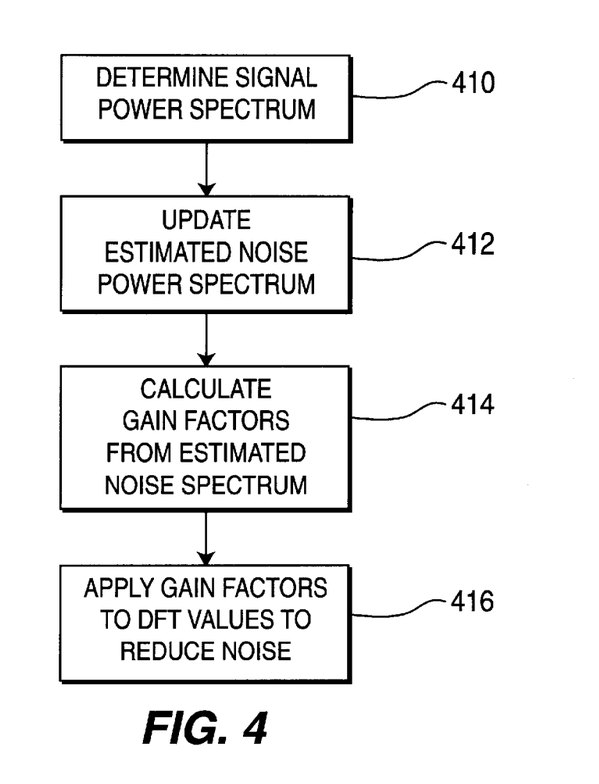
FIG. 4 is a flow-chart diagram which illustrates signal processing that may be performed by the control processor shown in FIGS. 1 and 2.

FIG. 4 illustrates the processing steps performed by the control processor 120 shown in FIGS. 1 and 2. The first step in this process, step 410 calculates the signal power spectrum. In the exemplary embodiment of the invention, the vector of complex DFT values for each frame is multiplied by its complex conjugate to produce a power spectrum for the frame. In the materials that follow, this operation is represented by the symbol $\|X_k\|^2$. The next step in the process is to update the estimated noise power spectrum. As described below, there are several techniques for accomplishing this task. One technique is to monitor each frame to determine the probability that the frame is a noise-only frame or a mixture of speech and noise. The noise only frames are then processed to determine the noise spectrum. One feature of the subject invention is to use a leaky integrator with a time-varying forgetting factor to derive the noise power spectrum from the noise-only frames. This time-varying forgetting factor purges past noise frames after detecting and processing a rapid transition in noise power to allow the detector to quickly adapt to changing noise signals.

Another type of noise detection method that may be used in step 412 is to simply monitor the power spectra of the frames for local minima. One or more of these local minima are then used as the noise spectrum.

After step 412, the next step, 414, calculates gain factors from the estimated noise spectrum. Several methods for calculating the gain factors are presented below. One method uses the concept of an audible masking threshold to attempt only to remove noise signals that are above a determined audible threshold. This method calculates a priori and a posteriori estimated signal to noise ratio values based on the audible signal energy. These ratios are then used in a variety of gain calculation algorithms in place of the more conventional a priori and a posteriori estimated signal to noise ratio values.

Finally, at step 416, the gain factors calculated at step 414 are applied to the gain adjusting circuits 124a, 124b and 124n (shown in FIGS. 1 and 2) to reduce the noise levels in the DFT values provided by the DFT processor 118.

Noise Tracking

The present disclosure is divided into two parts, a description of the noise tracking and noise estimating methods and a description of the gain calculation and noise reduction methods. The focus of the noise tracking methods is on tracking the noise spectrum in a possibly non-stationary environment. In the materials that follow, the combined voice and noise signal is modeled as an additive and uncorrelated signal where $x(t)=s(t)+n(t)$ and $P_x=P_s+P_n$. In the exemplary embodiment of the invention, a different power updating (or gain factor application) function is applied to noise-only and speech-plus-noise frames. Understanding of the following notation is helpful to understand the operation of the inventive method.

$H_n$ speech absent: $x(t)=n(t)$ $H_s$ speech present: $x(t)=s(t)+n(t)$ $\|X_k\|^2 = X_k^T X_k^*$, is the power spectrum of the frame k, where the "*" indicates the complex conjugate and $X_k$ is the vector of complex DFT values for the frame.

Let $p_n=p(H_n|X_k)$ and $p_s=p(H_s|X_k)=1-p(H_n|X_k)$ denote the probability for a noise-only frame and speech plus noise frame respectively. The update equation for tracking the noise spectrum can be written as equation (1).

$$\hat{P}_n(k)=p(H_n|X_k)\hat{P}_n(k|H_n)+p(H_s|X_k)\hat{P}_n(k|H_s) \quad (1)$$

Noise spectrum updating in speech frames (i.e. $\hat{P}_n(k|H_s)$) is generally ignored. That is to say, the noise in a speech plus noise frame is modeled as the noise component of the previous frame, as described by equation (2).

$$\hat{P}_n(k|H_s)=\hat{P}_n(k-1) \quad (2)$$

The inventor has determined that noise tracking in speech plus noise frames does not improve the accuracy of the noise spectrum estimate.

One relatively simple method for updating the noise spectrum consists of using a leaky integrator to track the noise during noise-only intervals, as shown in equation (3).

$$\hat{P}_n(k|H_n)=\lambda_n\hat{P}_n(k-1)+(1-\lambda_n)\|X_k\|^2 \quad (3)$$

Substitution of Equations (2) and (3) in (1) leads to equation (4)

$$\hat{P}_n(k)=[1-p(H_n|X_k)+\lambda_n p(H_n|X_k)]\hat{P}_n(k-1)+$$

$$[1-\lambda_n]p(H_n|X_k)\|X_k\|^2=\alpha_n(k)\hat{P}_n(k-1)+(1-\alpha_n(k))\|X_k\|^2 \quad (4)$$

In equation (4) $\alpha_n(k)=1-p(H_n|X_k)+\lambda_n p(H_n|X_k)$. Clearly, the forgetting factor $\alpha$ is time-varying since $p(H_n|X_k)$ is a function of frame number k. Equation (4) is the basic update equation used in the exemplary embodiment of the invention. In order to specify (4) completely, two issues need to be addressed: how is $\lambda_n$ to chosen (adapted) and how is $p(H_n|X_k)$ determined?

The Forgetting Factor $\lambda_N$

The forgetting factor $\lambda_n$ determines the effective time window length $1/(1-\lambda)$ for inclusion of past frames in the estimated noise power $\hat{P}_n$. For a frame rate of about 1 frame per 10 msec, it is common to choose $\lambda_n \approx 0.98$, yielding an effective memory of about 50 frames or 500 msec. The assumption is that the noise statistics are relatively stationary over this period. In certain environments, this assumption is not valid. For example, in an automobile environment, passing cars or the shifting of gears may introduce short-term non-stationary noise. Ideally, the forgetting factor should be adapted in real time so as to optimally predict the noise power for the next frame. Such an adaptive forgetting factor mechanism is derived below.

Equation (5) defines the operation of the leaky integrator update for the noise-only scenario, $$\hat{P}_n(k)=\lambda_n\hat{P}_n(k-1)+(1-\lambda_n)\|X_k\|^2 \quad (5)$$

The goal is for $\hat{P}_n(k-1)$ to be an accurate predictor of the noise power spectrum $\|N_k\|^2$. For the noise-only case, $X_k=N_k$, and hence the error signal $e(k)$ can be defined as $e(k)=\|X_k\|^2-\hat{P}_n(k-1)$.

The squared error gradient with respect to the forgetting factor is given by equation (6)

$$\frac{\partial e^2(k)}{2\partial \lambda_n} = -e(k) \times \partial \frac{\hat{P}_n(k-1)}{\partial \lambda_n} \quad (6)$$

$$= e(k)(\|X_{k-1}\|^2 - \hat{P}_n k - 2))$$

$$= e(k)e(k-1)$$

Using the steepest descent update method for the forgetting factor then evaluates to $\lambda_n(k)=\lambda_n(k-1)-\mu e(k)e(k-1)$. Since the goal is to keep $\lambda_{low}<\lambda n<1$, the update mechanism is implemented by the sign-least mean square (LMS), $$\lambda_n(k)=\lambda_n(k-1)-\mu \times sgn[e(k)e(k-1)]. \quad (7)$$

The inventor has determined that noise tracking systems which use an adaptive forgetting factor perform much better in non-stationary noise than systems which do not use an adaptive forgetting factor.

In an exemplary embodiment of the invention the leaky integrator defined by equations (5), (6) and (7) provided good results when $\mu$ was set to 0.01.

Speech Detection and $p(H_N|X_K)$

One method for determining noise power is to define noise power by Equation (2) if condition (8) evaluates to "true"

$$\|X_k\|^2 > (1+\beta)\hat{P}_n(k-1) \quad (8)$$

and to define it by equation (3) if condition (8) evaluates to false.

Condition (8) can be interpreted as a simple speech detection mechanism. If condition (8) is true, then $X_k$ is assumed to include both speech and noise, otherwise it is assumed that speech is absent and that $X_k$ represents only noise.

It is assumed that the speech and noise are uncorrelated Gaussian processes. Also, it is assumed that the signals in each frequency bin are independent. For this case, the probability distributions are represented by equations (9) and (10).

$$p(X|H_n) = \prod_{f=0}^{L-1} \frac{1}{\pi P_n(f)} \exp\left(\frac{\|X(f)^2\|}{P_n(f)}\right) \quad (9)$$

$$p(X|H_s) = \prod_{f=0}^{L-1} \frac{1}{\pi(P_n(f) + P_s(f))} \exp\left(-\frac{\|X(f)^2\|}{P_n(f) + P_s(f)}\right) \quad (10)$$

where f indexes the frequency bins (everything is assumed to be indexed by frame number k). Since $P_s$ cannot be measured directly this variable is substituted by its maximum likelihood estimate $\hat{P}_s = \|X\|^2 - \hat{P}_n$. Then, the speech vs. noise-only hypothesis test can be decided by the generalized likelihood ratio test (GLRT), as shown in equation (11).

$$\Lambda_g = \frac{1}{L} \log \frac{p(X|H_s)}{p(H|H_n)} \quad (11)$$

$$\approx \frac{1}{L} \sum_{f=0}^{L-1} \left(\frac{\|X(f)\|^2}{\hat{P}_n(f)} - 1\right) \begin{matrix} H_n \\ < \\ > \\ H_s \end{matrix} \beta$$

In other words, the decision statistic can be rewritten as condition (12).

$$\frac{1}{L} \sum_{f=0}^{L-1} \left(\frac{\|X(f)\|^2}{\hat{P}_n(f)}\right) \begin{matrix} H_n \\ < \\ > \\ H_s \end{matrix} 1 + \beta \quad (12)$$

Using Bayes' rules, it is trivial to convert the likelihood ratios to the desired probabilities $p(H_n|X_k)$, for example as shown in equation (13).

$$p(Hn|Xk) = \frac{p(H_n|X_k)p(H_n)}{p(H_n|X_k)p(H_n) + p(X_k|H_s)p(H_s)} \quad (13)$$

$$= \frac{1}{1 + \epsilon\Lambda},$$

where $$\epsilon = \frac{p(H_s)}{p(H_n)} \text{ and } \Lambda(k) = \frac{p(X_k|H_s)}{p(X_k|H_n)}.$$

Similarly, it follows that $$p(H_s) = \frac{\epsilon\Lambda(k)}{1 + \epsilon\Lambda(k)}.$$

For positive signal-to-noise ratios the decision statistic works quite well for (high amplitude) vowels. The amplitudes $\|Xk\|$, however, are much lower for consonants, and Equation (12) does not identify unvoiced sounds as well.

One aspect of the present invention is to expand the decision statistic (12) by tracking the Teager energy rather than the squared amplitude energy measure. The Teager energy of a sound sample x(t) is given by $\Psi_x = x^2(t) - x(t+1)x(t-1)$. It can be shown that the Teager energy is proportional to the amplitude-frequency product A2ω2. The inventors have determined that Teager energy reflects the energy consumed by the speech production process better than the squared amplitude energy measure.

If x(t)=s(t)+n(t) with n(t)~N (O.$\sigma_n^2$) then, for uncorrelated processes s(t) and n(t), the energy evaluates to $P_x = P_s + P_n$. Then $\Psi_x = x^2(t) - x(t+1)x(t-1) = s^2(t) - s(t+1)s(t-1) + \sigma_n^2 = \Psi_s + \Psi_n$. Hence, the Teager energies add for uncorrelated processes just like regular powers.

The derivation of equations (9) through (13) relies the energies $P_s$ and $P_n$ being uncorrelated Gaussian processes. In this instance, the Teager energies add just like regular energy. In addition, the Teager energies of noisy speech can be approximated reasonably well by uncorrelated Gaussian processes. This property then leads to changing the speech detection criterion of condition (12) to be in terms of Teager energies rather than the squared amplitude energy measure. The inventor has determined that this new criterion leads to improved detection of unvoiced components.

First, the inventor determined that the Teager energy of, for example, operations room noise and speech, can reasonably well be modeled as Gaussian processes. The speech detection derivation of equations (9) through (13) is applied in a relatively straightforward manner to the Teager energies, yielding condition (14)

$$\frac{1}{L} \sum_{f=0}^{L-1} \left(\frac{\|fX_k(f)\|^2}{\hat{\psi}_n(f, k-1)}\right) \begin{matrix} H_n \\ < \\ > \\ H_s \end{matrix} 1 + \beta \quad (14)$$

The inventor has compared the Teager energy to the squared amplitude energy measure both for the unvoiced /f/ sound and the voiced /a/ vowel and found that the noise-to-speech gap for the unvoiced sound is about 8 dB greater for the Teager energy than for the squared amplitude energy measure while both measures are approximately equal for the voiced sound. The inventor has determined that these figures are typical for other voiced sounds and consonants. Thus, the inventors conclude then that using Teager energy makes it easier to detect low-amplitude (high frequency) consonants while the sensitivity for vowel detection is little affected.

A new mechanism for tracking the (non-stationary) noise spectrum in speech has been proposed. One update equation for noise spectrum tracking is given by equation (4). The forgetting factor $\lambda_n$ is updated using equation (7), and $p(H_n|X_k)$ is given by $1/(1+\Lambda_T)$, where $\Lambda_T$ is given by equation (15).

$$\Lambda_T = \frac{1}{L} \sum_{f=0}^{L-1} \left(\frac{\|fX(f)\|^2}{\hat{\psi}_n(f)} - 1\right) \quad (15)$$

The inventor has determined that, under non-stationary conditions, the algorithm tends to be sensitive with respect to β. Unfortunately, the optimal value for β is hard to estimate a priori. Accordingly, a technique is described below that takes the "edge" off the binary conditions (8) and (14).

The method is to define the silence (noise-only) detector $p_n(k,i) = p(H_n|X_k)$ in does not have to be binary. A simple generalizations is provided below. Define $R(k) = P_x(k)/\hat{P}_n(k-1)$ and define $p_n$ as in equation (16), $$p_n = \begin{cases} 1 & \text{for } R(k) < \beta_0 \\ (\beta - R(k))/(\beta - \beta_0) & \text{for } \beta_0 \leq R(k) \leq \beta \\ 0 & \text{for } R(k) > \beta \end{cases} \quad (16)$$

where $1.5 < \beta < 2.5$ and $\beta_0 = 1$ are reasonable values. This modification softens the decision boundary and hence makes the noise tracking algorithm less sensitive to the design parameter $\beta$.

An alternative strategy which does not need a speech detector to develop an estimate of noise power is based on "minimum statistics" and takes advantage of the fact that short, noise-only bursts are nearly always present over a time window of about 0.5 sec. The noise floor can be estimated as the minimum smoothed-signal power spectrum over this time window. One exemplary noise power estimator is disclosed by G. Doblinger in an article entitled "Computationally Efficient Speech Enhancement by Spectral Minima Tracking in Subbands" *Proc. EUROSPEECH95*, Madrid, Spain, 1995, pp 1513–16. The smoothed power spectrum is given by equation (17) and the noise power estimator given by equation (18).

$$\hat{P}_x(k) = \lambda_x \hat{P}_x(k-1) + (1-\lambda_x)\|X_k\|^2 \quad (17)$$

$$P_n(k) = \quad (18)$$

$$\begin{cases} \lambda_n \hat{P}_n(k-1) + \dfrac{1-\lambda_n}{1-\beta}[\hat{P}_x(k) - \beta \hat{P}_x(k-1)] & \text{if } \hat{P}_x(k) > \hat{P}_x(k-1) \\ \hat{P}_x(k-1) & \text{else} \end{cases}$$

Doblinger recommends the design parameters $(\lambda_x, \lambda_n, \beta) = (0.7, 0.998, 0.96)$. The idea is that $\hat{P}_n$ tracks the minimum of the smoothed power spectrum $\hat{P}_x$. The soft-decision technique, described above, can be applied to Doblinger's method as well. Minimum statistics tracking as described by Doblinger is considered a robust and low complexity method for noise spectrum estimation and tracking.

Noise Reduction

The principle of spectrum based speech enhancement is simple. First a frame of the speech signal $x_k$ is transformed to an appropriate spectral domain, $X_k = Fx_k$. Next, the noisy speech spectrum is multiplied by a gain vector, $S_k = G_k X_k$, which is determined by the estimated noise spectrum. The "enhanced" spectrum, then, is inversely transformed, $\hat{s}_k = F^{-1}\hat{S}_k = F^{-1}G_k Fx_k$. This process is repeated for each frame in the sequence. Frame edge effects are reduced by windowed frame overlapping and overlap-add (or -save) reconstruction when the inverse transform is applied. The various forms of spectrum based speech enhancement, then, revolve around particular algorithmic choices for the following three operations: (1) spectral transformation, (2) noise spectrum estimation/tracking and (3) selection of appropriate gain factors. Exemplary spectral transformations (e.g. FFT) and methods for estimating and tracking noise spectrum are described above.

The Gain Factors

As set forth above, the power of the current frame k at frequency index i is defined by equation (19), $$P_x(k,i) = X_k(i)X_k^*(i) = \|X_k(i)\|^2 \quad (19)$$

For uncorrelated speech and noise signals, $P_s = P_x - P_n$. The key to spectrum based speech enhancement, therefore, is accurate tracking of the estimated spectra $\hat{P}_s$ for the clean speech and $\hat{P}_n$ for the noise. Once accurate values have been obtained for these spectra, the gain factors can be applied. When this method is used to suppress noise, the resulting speech is usually distorted. To illustrate how the speech distortion occurs, consider applying a diagonal gain matrix G to a transformed frame $X = S + N$, to get $\{\hat{S}\} = GX = GS + GN$. The difference between the estimated and clean speech signal is then given by equation (20).

$$\hat{S} - S = GN + (I-G)S \quad (20)$$

where GN is the residual noise and (I−G)S is the speech distortion. The goal of both minimizing GN and (I−G)S clearly involves a trade-off.

Power magnitude spectral subtraction can be represented by equation (21)

$$\hat{P}_s = P_X - \alpha \hat{P}_n = \frac{P_x/\hat{P}_n - \alpha}{P_x/\hat{P}_n} P_x = G^2 P_x \quad (21)$$

An a posteriori signal-to-noise ratio $R_{post}$ can be defined as $R_{post} = P_x/\hat{P}_n$ and a gain function can then be written as shown in equation (22), $$G^{ps} = \sqrt{\frac{R_{post} - \alpha}{R_{post}}} \quad (22)$$

One type of spectral subtraction uses minimum mean square error as disclosed by Y. Ephraim and D. Malah in an article entitled "Speech Enhancement Using a Minimum Mean-Square Error Short-Time Spectral Amplitude Estimator" *IEEE Trans. Acoustics, Speech and Signal Processing*, ASSP-32(6):1109, 1984. This minimum mean square error (MMSE) gain factor is given by equation (23).

$$G^{em} = \sqrt{\frac{\pi}{2}} \sqrt{\frac{1}{R_{post}}\left(\frac{R_{prio}}{1+R_{prio}}\right)} \times M\left[R_{post}\left(\frac{R_{prio}}{1+R_{prio}}\right)\right]. \quad (23)$$

where the function $M[\cdot]$ is defined by equation (24).

$$M[u] = \exp\left(-\frac{u}{2}\right)\left[(1+u)I_0\left(\frac{u}{2}\right) + uI_1\left(\frac{u}{2}\right)\right] \quad (24)$$

where $I_0$ and $I_1$ are modified Bessel functions of zero and first order.

Note that a new term $R_{prio} = \hat{P}_s/\hat{P}_n$, the a priori signal-to-noise ratio, has been introduced. It is commonly agreed that MMSE gain factors provide the best signal-to-noise ratio improvement. Unfortunately, greater SNR improvement usually comes at the cost of increased speech distortion, and hence it is yet unclear if MMSE based enhancement indeed is the preferred method in terms of speech quality improvement.

The inventor has determined that $G^{em}$ is well approximated (<3\% error) equation (25).

$$G^{em} \approx \hat{G}^{em} = G_{prio}^{\omega}\sqrt{1 + \frac{0.74}{R_{post} G_{prio}^{\omega}}} \quad (25)$$

where $G_{prio}{}^w = R^{prio}/(1 + R^{prio})$, is the Wiener gain expressed in terms of $R_{prio}$. Equation (25) illuminates that $R_{prio}$ dominates the gain. Moreover, for large values of $R_{post}$, $\hat{G}^{em}$ clearly approaches the Wiener gain $\hat{G}_{prio}^{\omega}$. Very small values of $R_{post}$ produce MMSE gains given by equation (26).

$$\hat{G}^{em} = G_{prio}^{\omega}\sqrt{1 + \frac{0.74}{R_{post}G_{prio}^{\omega}}} \approx \sqrt{\frac{0.74 G_{prio}^{\omega}}{R_{post}}} = \sqrt{\frac{0.74}{R_{post}}}\, G_{prio}^{ps} \quad (26)$$

where $G_{prio}^{ps} = \sqrt{G_{prio}^{\omega}}$ is the power subtraction gain expressed in $R_{prio}$. Note that the factor $\sqrt{0.74/R_{post}}$ in equation (26) may imply that $G^{em} > 1$.

In order to apply $G^{em}$ or $\hat{G}^{em}$ requires an estimate $R_{prio}$, which may be done, for example, by using the "decision directed" estimator of equation (27).

$$\hat{R}_{prio}(k) = \lambda_s \frac{G^2(k-1)P_x(k-1)}{\hat{P}_n(k)} + (1-\lambda_s)\max[R_{post}(k)-1]^+. \quad (27)$$

where the notation $[u]^+ = \max(u,0)$. One value that has been proposed for $\lambda_s$ is $\lambda_s = 0.98$. For relatively stationary signal-to-noise ratios, equation (27) tracks $R_{post}-1$, but for fluctuating signal-to-noise ratios, $R_{prio}$ tends to follow the first term on the right-hand side of the equation. Hence, equation (27) is more subtle than an ordinary leaky integrator, which would use $\lambda_s R_{prio}(k-1)$ as its first right hand side term instead.

Speech Uncertainty

In deriving the gain factors above, it was assumed that speech is present in at least some of the frames as it makes little sense to apply the gains to the noise-only regions. Rather than relying on a error-prone single-channel speech detector, Ephraim and Malah, in their above-referenced article and R. J. McAulay and M. L. Malpass, in an article entitled "Speech Enhancement Using a Soft Decision Noise Suppression Filter" *IEEE Trans. Acoustics, Speech and Signal Processing,* ASSP-28(2):137, 1980, have independently derived estimating formulae for the probability $p_s$ of the presence of a speech signal. This probability is given by equation (28).

$$p_s(lk) = \frac{\Gamma_k}{1+\Gamma_k} \quad (28)$$

where the generalized likelihood ratio $\Gamma$ in the article by Ephraim et al. is given by equation (29).

$$\Gamma = \frac{\exp\left(R_{post}\frac{R_{prio}}{1+R_{prio}}\right)}{2(1+R_{prio})} \quad (29)$$

In the above-referenced article by McAulay et al., the authors derive a formula for $\Gamma$ given by equation (30).

$$\Gamma = \exp(-R_{prio})I_0[2\sqrt{R_{prio}R_{post}}] \quad (30)$$

where $I_0$ is the Bessel function of the zero kind. In both formulae, an a priori speech probability $q=0.5$ is assumed. The inventor has determined that these functions exhibit similar behavior over a wide range of signal-to-noise ratios.

With the aid of the probability of speech, we may further refine the gain factor as shown in equation (31).

$$G^{total} = p_s G^{speech} + (1-p_s)G^{noise} = p_s G^{em} \quad (31)$$

where $G^{em}$ may be substituted for any of the other gain factors derived above for $G^{speech}$. It is assumed here that the gain for noise-only regions vanishes but we could of course accept a noise floor as in $G^{noise} = \sqrt{\beta}\,\hat{P}_n/P_x = \beta/\sqrt{R_{post}}$ Equations (28) and (29) represent two expressions for the probability of speech in the kth spectral bin. Equation (16), above, is a much simpler expression for the noise-only spectral bin probability. Rather than using equations (28) and (29), equation (16) may be used in the expression (31) in order to reduce the computation used to produce the gain measure.

Even though spectral updating decisions are made independently at the bin level without the use of a global speech detector, it is easy to combine the spectral evidence into an ad hoc speech detector for frame i, as in equation (32).

$$sp\,det(i) = \left[\left(\frac{1}{n}\sum_k p_s(k,i)\right) > \theta\right] \quad (32)$$

where $\theta$ is a detection threshold. The inventor has determined that an exemplary value for $\theta$ is $\theta = 0.15$ While it is not used in the exemplary speech enhancement algorithms, a low-cost speech detector can be very useful for speech compression applications or in machine voice recognition, where noise-only periods should not be processed.

Audible Noise Suppression

Due to both temporal and frequency (simultaneous) masking, an acoustic signal (say, speech) is able to mask (i.e., make imperceptible) another signal (noise) if the spectral energy of the noise is contained below a frequency-dependent threshold. This threshold, the Audible Masking Threshold (AMT), is a (nonlinear) function of the speech spectrum only. An AMT estimation algorithm proposed by J. D. Johnston in an article entitled "Estimation of Perceptual Entropy using Noise Masking Criteria" *Proc. ICASSP '88,* pp 2524–27, 1988.

The basic idea for AMT based speech enhancement is that rather than eliminating the noise a system may only "push" the noise down to in perceptual power level, i.e., to below the AMT. The audible masking threshold $\Theta$ is a function of the "clean" speech spectrum, $\Theta = \Theta(P_s(k,i))$. For a given signal power spectrum $P_x$, the audible noise spectrum is given by equation (33).

$$P_n^{aud} = [P_x - \max(P_s, \Theta)(P_s))]^+ \quad (33)$$

In a typical speech enhancement system, $P_s$ is usually not available and hence is estimated by equation (34).

$$\hat{P}_n^{aud} = \lfloor P_x - \max(\hat{P}_s, \hat{\Theta}(\hat{P}_s))\rfloor^+ \quad (34)$$

$$(= [P_x - \max(P_x - \hat{P}_n, \hat{\Theta}P_x - \hat{P}_n))])^+$$

$$= [\min(\hat{P}_n, P_x - \hat{\Theta})]^+$$

where $\hat{P}_s$ is derived using the spectral subtraction estimator $\hat{P}_s = P_x - \hat{P}_n$.

Spectral subtraction based on the estimated audible noise then evaluates to equation (35).

$$\hat{P}_s = P_x - \hat{P}_n^{aud} = \max(P_x - \hat{P}_n, \hat{\Theta}) \quad (35)$$

Equation (35) reveals the philosophy of AMT based speech enhancement: if the estimated speech spectrum falls below the estimated AMT, then the estimated AMT is used instead. This implies a smaller gain and hence less speech distortion at no cost in additional audible noise power. Thus, the AMT is being used as a noise floor.

The inventor proposes a new set of AMT based gain factors. First, the "audible" signal-to-noise ratios are defined as $R_{post}^{aud}=P_x/\hat{P}_n^{aud}$ and $R_{prio}^{aud}=\hat{P}_s/\hat{P}_n^{aud}$. Next, $R_{post}^{aud}$ and $R_{prio}^{aud}$ for $R_{post}$ and $R_{prio}$ are substituted into in any of the gain factor equations derived above. For example, the "audible noise ML gain factor" may be given by equation (36).

$$G_{aud}^{ml} = \frac{1}{2}\left[1+\sqrt{\frac{R_{post}^{aud}-1}{R_{post}^{aud}}}\right] \qquad (36)$$

The gain factors derived according to equation (36) tend to produce a maximum likelihood speech estimate, based on the audible noise only, rather than the full noise spectrum.

In the materials set forth above, a number of noise tracking and noise estimating methods have been presented and a number of methods have been presented for estimating the gain factors to apply to the DFT values in order to reduce the noise components of the signal. It is contemplated that any of these noise tracking and/or noise estimating methods may be used with any of the gain factor determination methods in order to produce a speech enhancement system.

While the invention has been described in terms of several exemplary embodiments, it is contemplated that it may be practiced with variations within the scope of the attached claims.

What is claimed:

1. A speech enhancement method which processes an input signal including both speech components and noise components to produce a noise-reduced output signal, the speech enhancement method comprising the steps of:
   receiving the input signal;
   segmenting the input signal into frames;
   applying a spectral transformation to the input signal to obtain respective spectral representations of each frame of the input signal;
   identifying frames that include speech components;
   estimating respective noise components of the respective spectral representations of the frames of the input signal using a time-varying forgetting factor that reduces any contribution to the estimated noise components from data frames that exhibit rapid changes in signal power relative to earlier received data frames; wherein the spectral representations of the frames of the input signal used to estimate the respective noise components exclude the frames that include speech components;
   reducing, in magnitude, the spectral representations of each frame by the estimated noise components to produce noise-reduced spectral representations of each frame.

2. A method according to claim 1, wherein the noise components are estimated using a leaky integrator represented by the equation $$\hat{P}_n(k)=\lambda_n\hat{P}_n(k-1)+(1-\lambda_n)\|X_k\|^2$$

where $\hat{P}_n(k)$ is an estimated noise power spectrum at frame k, $\lambda_n$ is an adaptive forgetting factor, and $\|X_k\|^2$ is a calculated signal power spectrum for frame k, wherein $\lambda_n$ varies from frame to frame and is defined by the equation:

$$\lambda_n(k)=\lambda_n(k-1)-\mu\times sgn[e(k)e(k-1)],$$

where $e(k)=\|X_k\|^2-\hat{P}_n(k-1)$ and $\mu$ is a weighting factor.

3. A method according to claim 1 wherein the step of estimating the respective noise components further includes the step of tracking Teager energy in the components of the data frames to more effectively distinguish unvoiced consonant sounds of the speech components from noise components.

4. A method according to claim 3, wherein the test for determining whether a frame is a noise-only frame or a speech plus noise frame is given by the condition:

$$\frac{1}{L}\sum_{f=0}^{L-1}\left(\frac{\|fX_k(f)\|^2}{\hat{\psi}_n(f,k-1)}\right) \begin{matrix}H_n\\ < \\ > \\ H_s\end{matrix} 1+\beta$$

where $H_s$ is an indication that the frame includes both speech and noise $H_n$ is an indication that the frame includes only noise, $\beta$ is a threshold value, f is an index variable that indexes L frequency bins of frame k, $\|fX_k(f)\|^2$ is the power spectral component of frequency bin f and $\hat{\Psi}_n(f,k-1)$ is an estimate of the Teager energy of the noise component for frequency bin f of frame k-1, where the estimated Teager energy is given by the equation $\hat{\Psi}_n(f,k)=\hat{P}_n(f,k)$, where $\hat{P}_n(f,k)$ is the estimated noise power spectral component of frequency bin f of frame k.

5. A method according to claim 1 wherein the step of estimating the respective noise components further includes the steps of:
   identifying frames which include noise components to the relative exclusion of speech components;
   classifying each frame as containing only noise components or containing both noise components and speech components, wherein the transition between a noise-only signal and a voice and noise signal is made gradual to reduce the sensitivity of the noise tracking system to system parameters.

6. A method according to claim 1, wherein the step of estimating the respective noise components employs at least one of calculated a priori and a posteriori signal to noise ratios based on an audible noise threshold.

7. A method according to claim 6, wherein the step of estimating the respective noise components includes the steps of:
   calculating the a posteriori audible signal to noise ratio, $R_{post}^{aud}$, according to the equation $R_{post}^{aud}=P_x/\hat{P}_n^{aud}$, where $P_x$ is a power spectrum of the speech plus noise signal,
   $\hat{P}_n^{aud}$ is given by the formula, $\hat{P}_n^{aud}=[\min(\hat{P}_n,P_x-\hat{\Theta})]^+$
   where, $\hat{\Theta}$ is an estimated audible noise threshold,
   $\hat{P}_n$ is an estimated power spectrum of the noise signal, and
   the function $[x]^+$ is the function $\max(x,0)$.

8. A method according to claim 7 wherein the step of reducing, in magnitude, the spectral representations of each frame by the estimated noise components to produce noise-reduced spectral representations of each frame, includes the steps of:

calculating gain functions, G, to be applied to the spectral representations of the frames according to the equation:

$$G = \frac{1}{2}\left[1 + \sqrt{\frac{R_{post}^{aud} - 1}{R_{post}^{aud}}}\right];$$

multiplying the spectral representations of the frames by the gain factors to produce the noise-reduced spectral.

9. A method according to claim 7, further including the step of calculating the audible a priori signal to noise ratio, $R_{prio}^{aud}$, according to the equation $$R_{prio}^{aud} = \hat{P}_s / \hat{P}_n^{aud},$$

where $\hat{P}_s = P_x - \hat{P}_n^{aud}$, wherein the step of reducing, in magnitude, the spectral representations of each frame by the estimated noise components to produce noise-reduced spectral representations of each frame, includes the steps of:

calculating gain functions, G, to be applied to the spectral representations of the frames according to the equation:

$$G = R_{prio}^{aud} / (1 + R_{prio}^{aud});$$

and multiplying the spectral representations of the frames by the gain factors to produce the noise-reduced spectral representation of the frames.

10. A computer-usable carrier including a computer program that controls a computer to perform speech enhancement, the computer program causing the computer to process an input signal including both speech components and noise components to produce a noise-reduced output signal, by causing the computer to perform the steps of:

receiving the input signal;

segmenting the input signal into frames;

applying a spectral transformation to the input signal to obtain respective spectral representations of each frame of the input signal;

identifying frames that include speech components;

estimating respective noise components of the respective spectral representations of the frames of the input signal using a time-varying forgetting factor that reduces any contribution to the estimated noise components from data frames that exhibit rapid changes in signal power relative to earlier received data frames; wherein the spectral representations of the frames of the input signal used to estimate the respective noise components exclude the frames that include speech components;

reducing, in magnitude, the spectral representations of each frame by the estimated noise components to produce noise-reduced spectral representations of each frame.

11. A computer usable carrier according to claim 10, wherein the computer program models the noise components as a leaky integrator represented by the equation $$\hat{P}_n(k) = \lambda_n \hat{P}_n(k-1) + (1-\lambda_n)\|X_k\|^2$$

where $\hat{P}_n(k)$ is an estimated noise power spectrum at frame k, $\lambda_n$ is an adaptive forgetting factor, and $\|X_k\|^2$ is a calculated signal power spectrum for frame k, wherein $\lambda_n$ varies from frame to frame and is defined by the equation:

$$\lambda_n(k) = \lambda_n(k-1) - \mu \times sgn[e(k)e(k-1)],$$

where $e(k) = \|X_k\|^2 - \hat{P}_n(k-1)$ and $\mu$ is a weighting factor.

* * * * *